(12) United States Patent
Liu (10) Patent No.: US 10,870,322 B2
(45) Date of Patent: Dec. 22, 2020

(54) CODE WRITING DEVICE, TIRE PRESSURE MONITORING UNIT AND CONTROL METHOD

(71) Applicant: Silergy Semiconductor Technology (Hangzhou) LTD, Hangzhou (CN)

(72) Inventor: ChiKang Liu, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 163 days.

(21) Appl. No.: 16/113,541

(22) Filed: Aug. 27, 2018

(65) Prior Publication Data

US 2019/0070909 A1 Mar. 7, 2019

(30) Foreign Application Priority Data

Sep. 5, 2017 (CN) .......................... 2017 1 0789023

(51) Int. Cl.
*B60C 23/04* (2006.01)
*G01L 19/00* (2006.01)

(52) U.S. Cl.
CPC ...... *B60C 23/0471* (2013.01); *B60C 23/0455* (2013.01); *B60C 23/0461* (2013.01); *B60C 23/0479* (2013.01); *G01L 19/0092* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/0459; B60C 23/0474; B60C 23/0489; B60C 23/0491; B60C 25/002; B60C 25/005; B60C 25/007; B60C 29/02; B60C 99/006; B60C 11/0332; B60C 11/24; B60C 13/02; B60C 15/0036; B60C 17/02; B60C 2009/2022; B60C 2200/02; B60C 2200/06; B60C 2200/065; B60C 23/001; B60C 23/007; B60C 23/0467;
(Continued)

(56) References Cited

U.S. PATENT DOCUMENTS 6,166,698 A 12/2000 Turnbull et al.
7,224,267 B1 5/2007 Ellis
(Continued)

FOREIGN PATENT DOCUMENTS

CN 102862450 A 1/2013

*Primary Examiner* — Andre J Allen
(74) *Attorney, Agent, or Firm* — Michael C. Stephens, Jr.

(57) ABSTRACT

A tire pressure monitor can include: a pressure sensor configured to detect a gas pressure parameter of a tire; a wireless receiver configured to initially be in a sleep mode, and to receive a communication protocol wirelessly after being woken up from the sleep mode; and a microprocessor configured to wake up the wireless receiver according to the gas pressure parameter.

12 Claims, 5 Drawing Sheets

(58) Field of Classification Search
CPC ............ B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; B60C 23/0498; B60C 23/064; B60C 23/0488; B60C 23/0496; B60C 23/0408; B60C 23/041; B60C 23/0411; B60C 23/004; B60C 23/02; B60C 23/0401; B60C 23/406; B60C 23/0416; B60C 23/0433; B60C 23/0455; B60C 3/04; B60C 13/001; B60C 23/008; B60C 23/0413; B60C 23/0427; B60C 23/0447; B60C 23/0454; B60C 23/0457; B60C 23/0462; G01L 17/00; G01L 17/005; G01L 19/0645; G01L 19/147; G01L 1/16; G01L 1/18; G01L 7/187; G01L 9/0052; G01L 9/008

USPC .................................................. 73/146–146.8
See application file for complete search history.

(56) References Cited

U.S. PATENT DOCUMENTS

| | | |
|---|---|---|
| 8,095,333 B2 | 1/2012 | Penot et al. |
| 8,421,612 B2 | 4/2013 | Sugiura |
| 8,922,359 B2 | 12/2014 | Lim |
| 9,420,408 B2 | 8/2016 | Liu |
| 2009/0102636 A1 | 4/2009 | Tranchina |
| 2010/0139383 A1* | 6/2010 | Haswell ................... B60C 11/24 73/146 |
| 2011/0205047 A1 | 8/2011 | Patel et al. |
| 2015/0149110 A1* | 5/2015 | Shin ..................... B60C 23/0457 702/130 |
| 2017/0282655 A1 | 10/2017 | Liu et al. |
| 2018/0345742 A1* | 12/2018 | Huang ................. B60C 23/0496 |
| 2019/0255893 A1* | 8/2019 | Van Wiemeersch ......................... B60C 23/0479 |

\* cited by examiner

CODE WRITING DEVICE, TIRE PRESSURE MONITORING UNIT AND CONTROL METHOD

RELATED APPLICATIONS

This application claims the benefit of Chinese Patent Application No. 201710789023.9, filed on Sep. 5, 2017, which is incorporated herein by reference in its entirety.

FIELD OF THE INVENTION

The present invention generally relates to the field of automotive monitoring, and more particularly to code writing devices, tire pressure monitors, and associated control methods.

BACKGROUND

Tire pressure monitoring systems (TPMS) can be used to monitor the status of tires by recording the tire speed or by use of electronic sensors in the tires, in order to provide effective safety for the driving of motor vehicles. In one approach, an indirect tire pressure monitoring system can be used to determine whether the tire pressure is normal by the rotating speed difference. In another approach, a direct tire pressure monitoring system can utilize air pressure monitoring and temperature sensors in the tires. The air pressure and temperature of the tires may be monitored when the motor vehicles are driving or stationary. Alarms may go off when the tires are in a dangerous state (e.g., high pressure, low pressure, high temperature, etc.), in order to avoid potential traffic accidents caused thereby.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A tire pressure monitoring system (TPMS) is a vehicle initiative security system applying a wireless transmission technology. The tire pressure monitoring system can utilize a tire pressure monitor fixed in the tire of an automotive in order to detect tire pressure, temperature and other parameters, and to transmit the parameters to a controller in a cab to display digitally in real time. When the tire is abnormal, the driver may be alerted by buzzer or voice. Thus, the pressure and the temperature of the tires can be maintained within a standard range, thereby reducing the probability of punctures and tire damage, and also reducing fuel consumption and damage to vehicle components.

The life of the battery of the tire pressure monitor is typically about 5 years. Since the tire pressure monitor is 100% sealed by glue during manufacture, when the battery of the tire pressure monitor is depleted, the tire pressure monitor may need to be replaced by a new monitor. In addition, since each brand or each vehicle model of the tire pressure monitoring system may have its own unique communication protocol, retailers may need to prepare corresponding tire pressure monitors for different models, which can result in retailers having a relatively large inventory.

Figure 1:
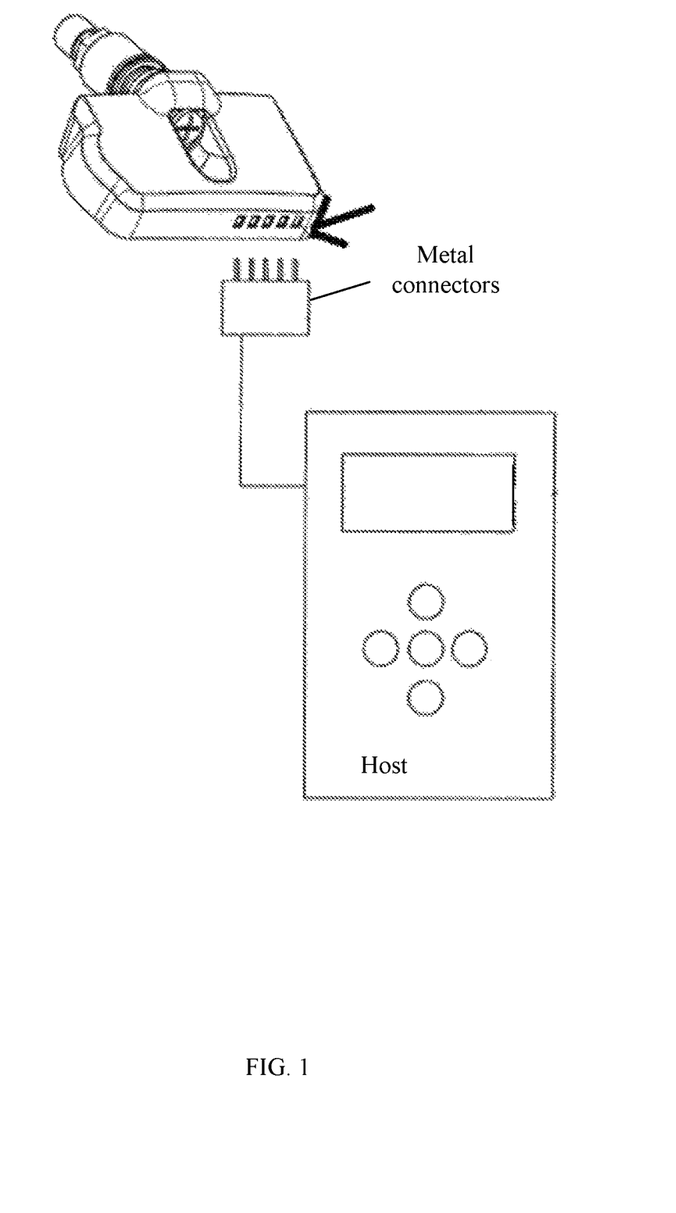
FIG. 1 is a schematic block diagram of an example code writing device.

Referring now to FIG. 1, shown is a schematic block diagram of an example code writing device. In this example, the device can include a tire pressure monitor and a host. The tire pressure monitor may have metal holes, and the host metal connectors. The host can be connected to the metal holes of the tire pressure monitor through the metal connectors, and may transmit the corresponding communication protocol to the tire pressure monitor. Thus, the retailers may only need to store the same type of the tire pressure monitor, and write the corresponding communication protocol to the tire pressure monitor when it needs to be installed. This can improve the universality and flexibility of the tire pressure monitor offerings, and may reduce the inventory backlog of the retailers. However, such devices may need additional metal connectors, thereby resulting in high costs. Further, the tire pressure monitor cannot be fully sealed in this case due to the exposure of the metal holes for connection, such that the tire pressure monitor can suffer from corrosion in use, thereby affecting the service life.

Figure 2:
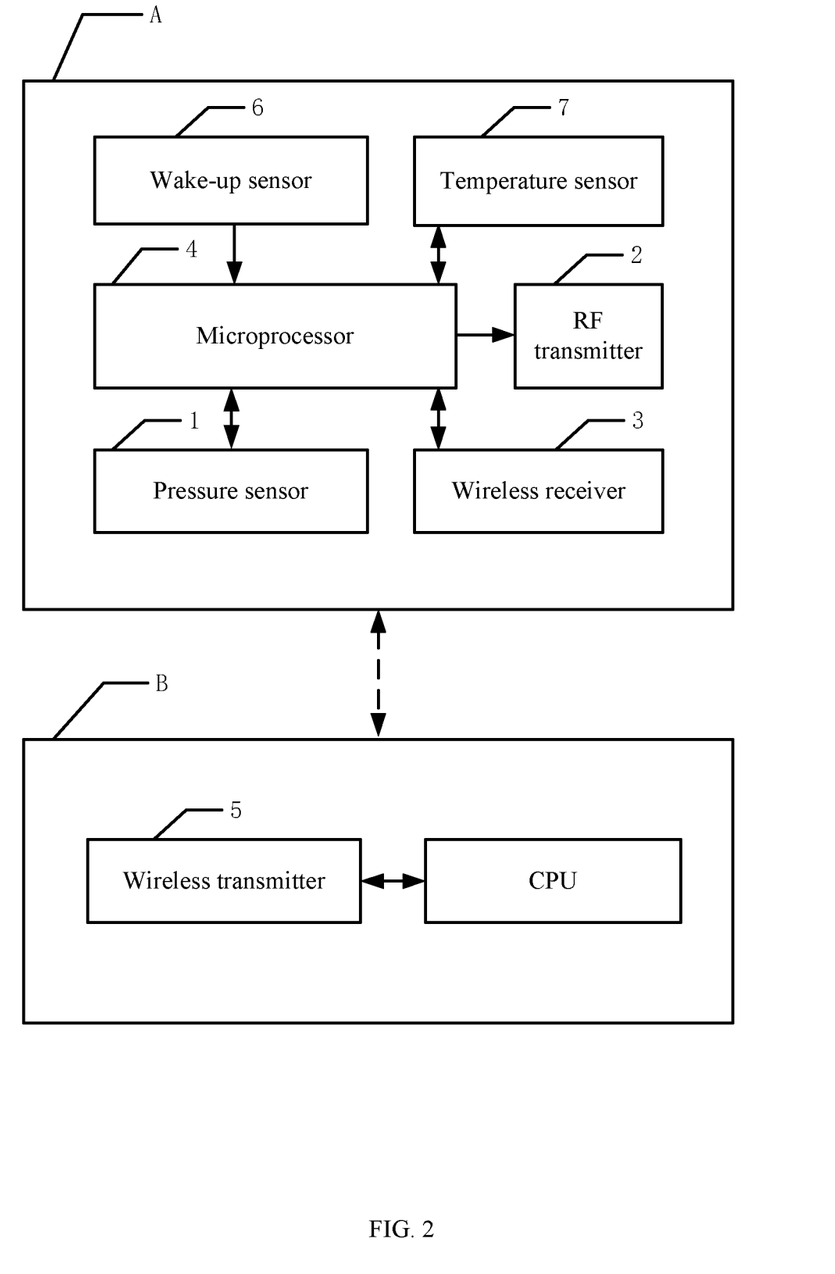
FIG. 2 is a schematic block diagram of a first example code writing device, in accordance embodiments of the present invention.

Referring now to FIG. 2, shown is a schematic block diagram of a first example code writing device, in accordance embodiments of the present invention. In this example, the code writing device can include tire pressure monitor A and host B. Tire pressure monitor A may not initially be written or fixed as to a given communication protocol. Prior to use, tire pressure monitor A may need to store the communication protocol that corresponds to the vehicle model. Further, a variety of communication protocols suited to different vehicle models can be stored in host B. Also, tire pressure monitor A and host B can be wirelessly connected. Therefore, host B may wirelessly transmit the corresponding communication protocol to tire pressure monitor A, and tire pressure monitor A can receive and store the communication protocol (e.g., in a memory in tire pressure monitor A). Moreover, the communication protocol can also be stored in a cloud server, and host B can download the communication protocol of specific vehicle model from the cloud server, and then transmit it to tire pressure monitor A when needed. Thus, the communication protocol in host B may always be the most updated, saving the memory space within host B. After being written into the corresponding communication protocol, tire pressure monitor A can detect the pressure, temperature, and other suitable data in real time in tires of an automobile under running or stationary state. The data can also be sent out to obtain corresponding control operations, thereby preventing traffic accidents and prolonging the life of the tires.

Tire pressure monitor A can include pressure sensor 1, radio frequency (RF) transmitter 2, wireless receiver 3, and microprocessor 4. Pressure sensor 1 can detect a gas pressure parameter, and RF transmitter 2 can send the gas pressure parameter out wirelessly through an RF transmitting antenna. When tire pressure monitor A acquires the communication protocol, microprocessor 4 can wake up wireless receiver 3 in accordance with the gas pressure parameter detected by pressure sensor 1. Wireless receiver 3 can receive the communication protocol wirelessly after being woken up from an initial sleep mode. Also, wireless receiver 3 can include a wireless receiving antenna and a power switch. When wireless receiver 3 is woken up, the power switch can be turned on, and wireless receiver 3 can receive the communication protocol through the wireless receiving antenna.

In an example, the RF transmitting antenna and the wireless receiving antenna can respectively be formed on the circuit board of tire pressure monitor A in the form of micro-strip antennas, which can be arranged on the same side or different sides of the circuit board. Host B can include wireless transmitter 5 that matches with wireless receiver 3. Wireless transmitter 5 can transmit the communication protocol pre-stored in host B to wireless receiver 3 wirelessly through the RF transmitting antenna. Wireless receiver 3 can receive the communication protocol through the wireless receiving antenna, and send it to microprocessor 4 to store.

In this example, wireless receiver 3 and wireless transmitter 5 can be Bluetooth low energy (BLE) transceivers. The BLE transceiver is based on BLE technology and can include a BLE receiver and a BLE transmitter. BLE technology is a robust wireless technology with low cost, short range, and interoperability, and BLE technology uses a variable connection time internal, which is set according to the specific application. Also, BLE technology may use a very fast connection method, such that it can usually be in a "non-connected" state, which can save energy. At this time, both ends of the link may only know each other. The link may be opened when necessary, and then the link may be turned off in the shortest possible time, thereby minimizing power consumption.

Figure 3:
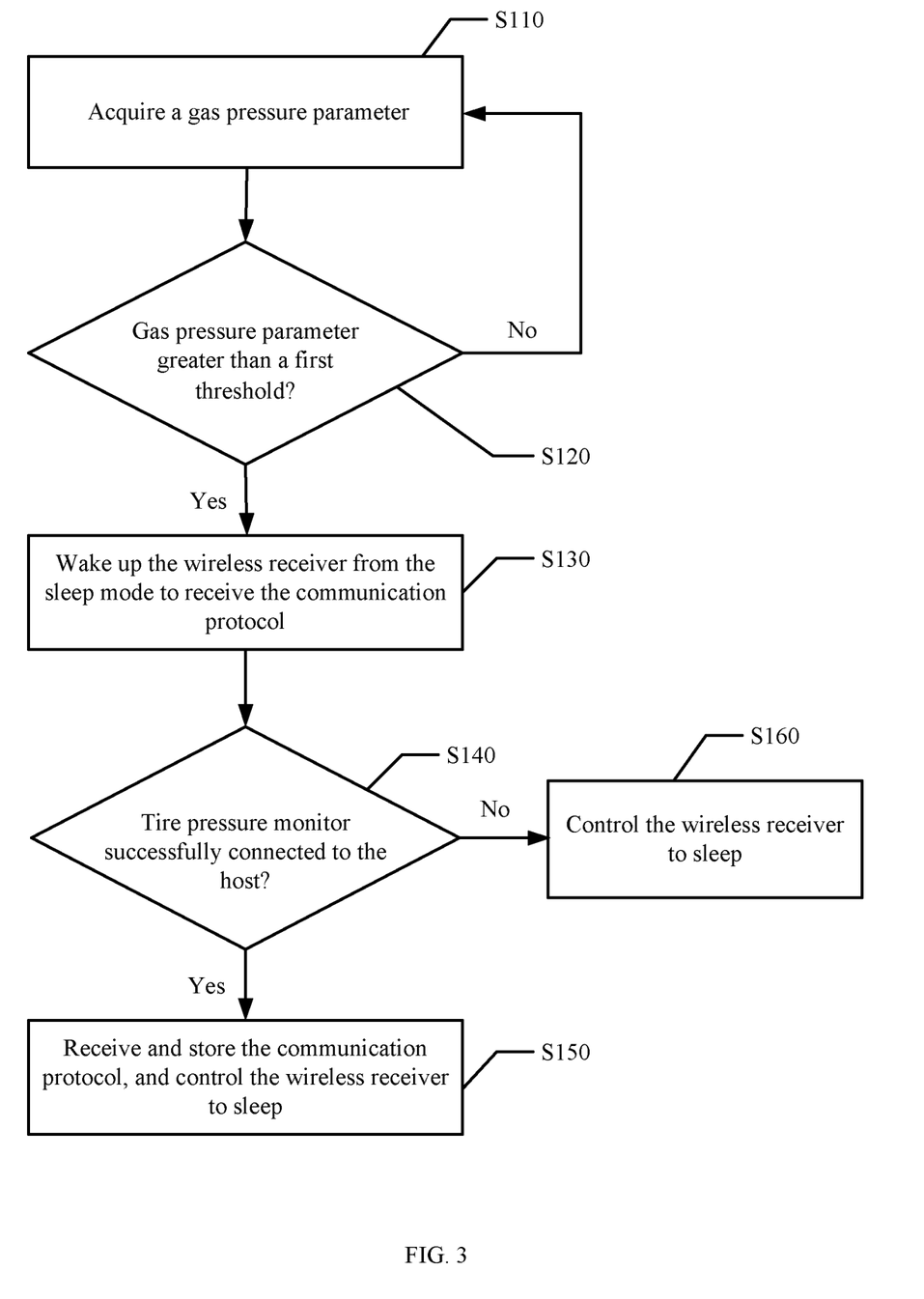
FIG. 3 is a flow diagram of a first example method of controlling a tire pressure monitor, in accordance embodiments of the present invention.

Referring now to FIG. 3, shown is a flow diagram of a first example method of controlling a tire pressure monitor, in accordance embodiments of the present invention. In order for tire pressure monitor A to acquire the appropriate communication protocol, the following steps may be utilized. Firstly, as shown in S110, a gas pressure parameter can be acquired. A new tire pressure monitor A can typically be stored in an environment of 1 atm (i.e., relative pressure of 0 Psi) prior to being installed in a tire. When a new tire pressure monitor A is installed in the tire, the pressure inside the tire may, e.g., be greater than 30 Psi, which can be detected as the gas pressure parameter. The gas pressure parameter detected by pressure sensor 1 of tire pressure monitor A may differ depending on the actual pressure in the tire. Pressure sensor 1 can periodically transmit the detected gas pressure parameter to microprocessor 4 through the communication bus, and then microprocessor 4 may acquire the gas pressure parameter.

Then, as shown in S120, it can be determined whether the gas pressure parameter is greater than a first threshold. If this determination of S120 indicates that the gas pressure parameter is greater than the first threshold, S130 can be performed. Otherwise, S110 may again be performed. Then, as shown in S130, the wireless receiver that is in the sleep mode can be woken up in order to receive the communication protocol. Microprocessor 4 can determine this control in accordance with the received gas pressure parameter. For example, when the gas pressure parameter is greater than the first threshold, microprocessor 4 can turn on the power switch of wireless receiver 3, thereby waking up wireless receiver 3. Alternatively, microprocessor 4 can wake up wireless receiver 3 in other approaches, such as transmitting a wake-up order to wireless receiver 3. After wireless receiver 3 is woken up, tire pressure monitor A can begin forming a wireless connection with host B.

Then, as shown in S140, it can be determined whether the tire pressure monitor is successfully connected to the host. If the determination of S140 indicates that the tire pressure monitor and the host are connected successfully, S150 may be performed, and otherwise S160 can be performed. Then, as shown in S150, the communication protocol can be received and stored, and the wireless receiver may be controlled to sleep. When tire pressure monitor A and host B are connected successfully, host B can transmit the corresponding communication protocol through wireless transmitter 5. Then, wireless receiver 3 of tire pressure monitor A can receive the communication protocol transmitted by host B through the wireless receiving antenna, whereby the length of the wireless receiving antenna can be predetermined according to requirements.

For example, host B can be a mobile phone or a tablet computer, and the communication protocol can be stored in a storage device within the mobile phone or tablet. Moreover, the communication protocol can also be stored in the cloud server. When tire pressure monitor A needs an updated communication protocol, host B can download the communication protocol corresponding to specific vehicle model, and then send the protocol to tire pressure monitor A. Therefore, the communication protocol can always be the most updated, thereby saving memory space in host B.

After ensuring that the received communication protocol is successfully written into the memory unit by tire pressure monitor A, microprocessor 4 can turn off the power switch of wireless receiver 3, such that wireless receiver 3 may enter the sleep mode, thereby saving battery power and prolonging the life of the battery. Then as shown in the step S160, the wireless receiver can be controlled to enter the sleep mode. After wireless receiver 3 is woken up, if wireless receiver 3 cannot receive the communication protocol within a predetermined time due to the absence of host B or other conditions, microprocessor 4 can turn off the power switch of wireless receiver 3, such that wireless receiver 3 can enter the sleep mode.

Tire pressure monitor A can be in a normal operation mode after receiving and storing the communication protocol. For example, pressure sensor 1 can send the detected gas pressure parameter to microprocessor 4 through the internal communication bus, and then microprocessor 4 can serially send the received data to RF transmitter 2. RF transmitter 2 can transmit a radio wave that is modulated according to a set ultrahigh frequency (UHF) radio wave through the RF transmitting antenna. A UHF radio wave can refer to a radio wave with a frequency of from 300 to 3000 MHz and a wavelength of from 1 m to 1 dm.

For example, tire pressure monitoring A can also include wake-up sensor 6 and temperature sensor 7. Since tire pressure monitor A is installed inside the tire that is difficult to be frequently replaced, the life of the battery in tire pressure monitor A should be at least several years. Wake-up sensor 6 can wake up tire pressure monitor A from the sleep mode when necessary, thereby achieving the purpose of saving electricity and prolonging battery life. In addition, wake-up sensor 6 can wake up tire pressure monitor A, such that microprocessor 4 can begin operation. Also, since the tire pressure is closely related to the temperature, and according to data analysis, the tire wear may increase by, e.g., 2% for every 1° C. increase in temperature inside the tire. Therefore, by measuring and acquiring the temperature inside the tire through temperature sensor 7, traffic accidents can also be prevented. It should be understood that tire pressure monitor A can also include other types of sensors and circuitry according to particular requirements.

In particular embodiments, a wireless receiver and pressure sensor can be provided in the tire pressure monitor. According to the gas pressure parameter, the tire pressure monitor can wake up the wireless receiver to receive the communication protocol that is sent by the host, and may be written to the memory unit (e.g., within microprocessor 4). In this way, particular embodiments can simply and quickly store the communication protocol in the tire pressure monitor without significantly consuming battery power. Further, the tire pressure monitor can be integrally sealed so as not to be easily damaged in use.

Figure 4:
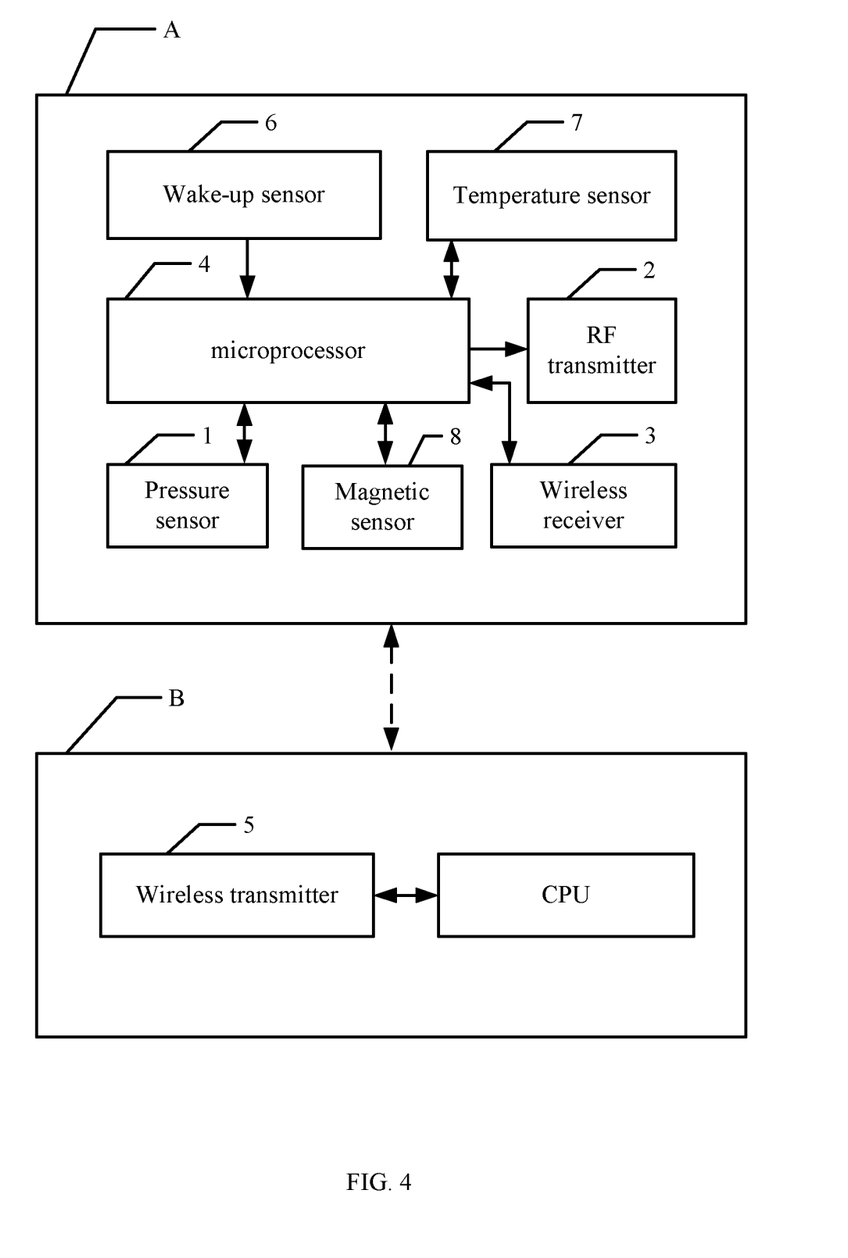
FIG. 4 is a schematic block diagram of a second example code writing device, in accordance embodiments of the present invention.

Referring now to FIG. 4, shown is a schematic block diagram of a second example code writing device, in accordance embodiments of the present invention. This example code writing device can include tire pressure monitor A and host B. Tire pressure monitor A needs to store a communication protocol corresponding to the vehicle model prior to being in use. In addition, various communication protocols to support a variety of vehicle models can be stored in host B. Also, tire pressure monitor A and host B can be wirelessly connected. Therefore, host B can wirelessly transmit the corresponding communication protocol to tire pressure monitor A, and tire pressure monitor A can receive and store the communication protocol.

Tire pressure monitor A can include pressure sensor 1, RF transmitter 2, wireless receiver 3, microprocessor 4, and magnetic sensor 8. Tire pressure monitor A can detect a gas pressure parameter, and magnetic sensor 8 can detect a magnetic field intensity parameter. RF transmitter 2 can transmit the gas pressure parameter externally wirelessly through the RF transmitting antenna. When the tire pressure monitoring system wishes to acquire the magnetic field intensity parameter, RF transmitter 2 can transmit the magnetic field intensity parameter through the RF transmitting antenna. Wireless receiver 3 can be woken up by microprocessor 4 according to the gas pressure parameter and the magnetic field intensity parameter. Also, wireless receiver 3 can receive the communication protocol wirelessly after being woken up from the sleep mode.

Wireless receiver 3 can also include a wireless receiving antenna and a power switch. When wireless receiver 3 is woken up, the power switch can be turned on, and then wireless receiver 3 can receive the communication protocol through the wireless receiving antenna. Moreover, microprocessor 4 can also wake up wireless receiver 3 by other approaches, such as by sending a wake-up signal to wireless receiver. Host B can include wireless transmitter 5 that matches with wireless receiver 3. Wireless transmitter 5 can wirelessly transmit the pre-stored communication protocol to wireless receiver 3. Then, wireless receiver 3 can transmit the received communication protocol to the memory unit in microprocessor 4 for storage. For example, wireless receiver 3 and wireless transmitter 5 can be BLE transceivers.

Figure 5:
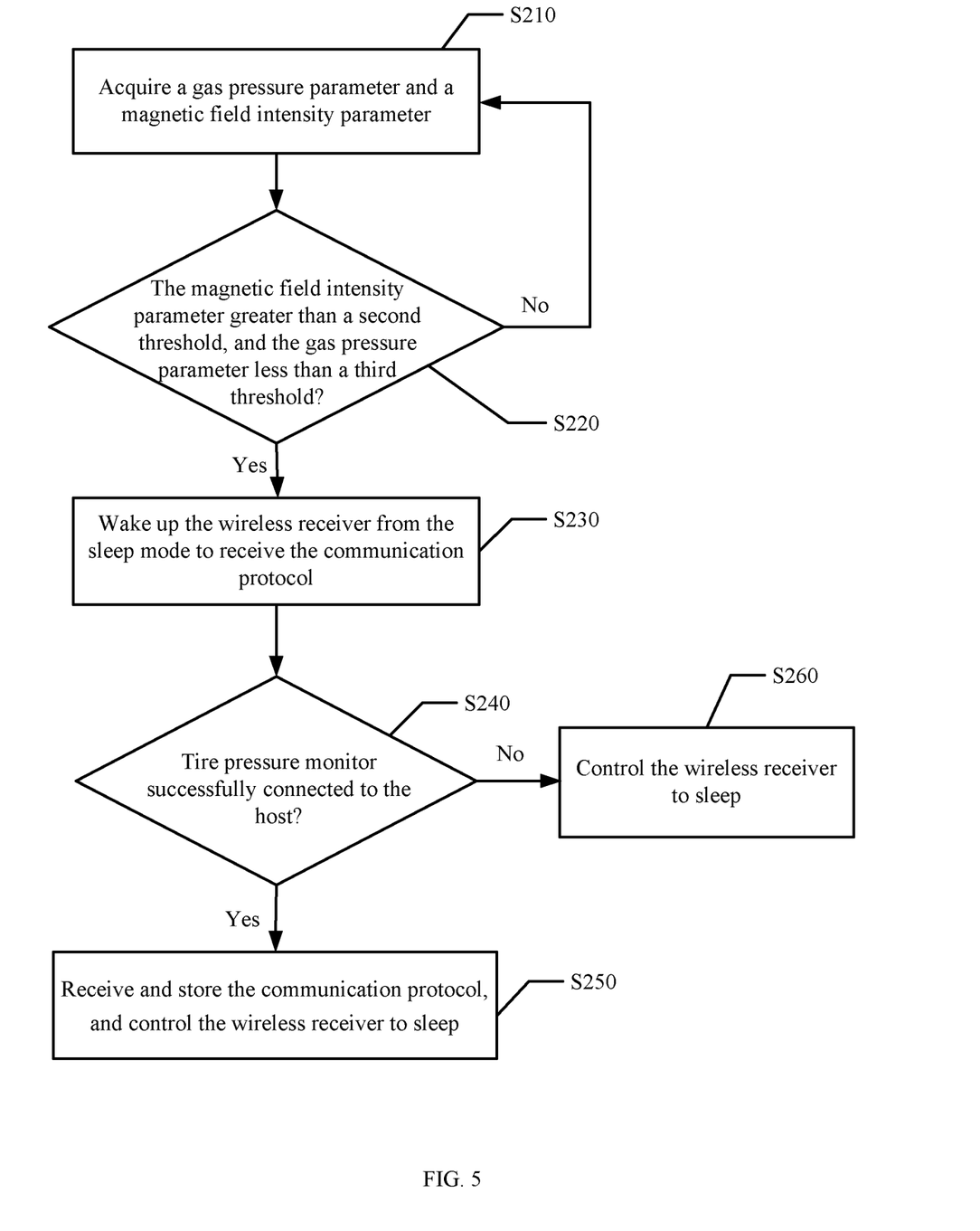
FIG. 5 is a flow diagram of a second example method of controlling a tire pressure monitor, in accordance embodiments of the present invention.

Referring now to FIG. 5, shown is a flow diagram of a second example method of controlling a tire pressure monitor, in accordance embodiments of the present invention. Firstly, as shown in S210, a gas pressure parameter and a magnetic field intensity parameter can be acquired. New tire pressure monitor A may typically be stored in an environment of 1 atm (i.e., relative pressure of 0 Psi). Before the new tire pressure monitor A being installed in the tire, magnetic materials may be utilized to close tire pressure monitor A, in order to generate the magnetic field. Therefore, the magnetic field intensity parameter detected by magnetic sensor 8 can be changed. Further, the gas pressure parameter may be lower because tire pressure monitor A is not yet installed. Pressure sensor 1 and magnetic sensor 8 can periodically transmit the gas pressure parameter and the magnetic field intensity parameter to microprocessor 4 through internal communication busses. In this way, microprocessor 4 can acquire the gas pressure parameter and the magnetic field intensity parameter.

Due to magnetic sensor 8, wireless receiver 3 can be woken up when the detected magnetic field intensity parameter and the gas pressure parameter satisfy certain predetermined conditions. For the use of magnetic sensor 8, wireless receiver 3 can be woken up by changing the outside magnetic field (e.g., putting the magnet close to tire pressure monitor A), such that tire pressure monitor A can be in a state where it can be written. Further, referring to the gas pressure parameter, wireless receiver 3 can be woken up when tire pressure monitor A is under a normal atmospheric environment (e.g., when tire pressure monitor A is not yet installed in the tire). Therefore, this example can prevent wireless receiver 3 from being always woken up when the automobile parks near a certain magnetic material during driving, thereby avoiding power energy waste. Thus in this particular example, tire pressure monitor A can perform the writing operation before being installed in the tire due to the magnetic sensor, which can simplify the overall operation.

Then, as shown in S220, it can be determined whether the magnetic field parameter is greater than a second threshold, and the gas pressure parameter is less than a third threshold. If this determination result of S220 indicates that the magnetic field intensity is greater than the second threshold, and the gas pressure is less than the third threshold, S230 may be performed, otherwise S210 can be performed. Then, as shown in S230, the wireless receiver can be woken up from the sleep mode in order to be able to receive the communication protocol.

Microprocessor 4 can perform the determination for S220 in accordance with the gas pressure parameter and the magnetic field intensity parameter. When the magnetic field intensity is greater than the second threshold, and the gas pressure is less than the third threshold, microprocessor 4 can turn on the power switch of wireless receiver 3 in order to wake up wireless receiver 3. Tire pressure monitor A can then begin to form a wireless connection with host B. As shown in S240, it can be determined whether the tire pressure monitor is successfully connected to the host. If this connectivity determination of S240 indicates that the tire pressure monitor is successfully connected to the host, S250 can be performed, and otherwise S260 may be performed. Then, as shown in S250, the communication protocol can be received and stored in tire pressure monitor A, and the wireless receiver may be controlled to again enter the sleep mode.

Tire pressure monitor A can be successfully connected to host B, such that host B can transmit the corresponding communication protocol externally through wireless transmitter 5, and wireless receiver 3 in tire pressure monitor A can receive the communication protocol transmitted by host B through the wireless receiving antenna. The length of the wireless receiving antenna can set according to various requirements. For example, host B can be a mobile phone or a computer tablet, or any other suitable computing device. Also, the communication protocol can be saved in a storage device within host B. Alternatively or additionally, the communication protocol can be saved in a cloud server. When tire pressure monitor A needs the communication protocol, host B can download the communication protocol corresponding to the specific vehicle model, and then transmit it to tire pressure monitor A. Thus, the communication protocol can always be the most updated, thereby saving memory space within host B.

Tire pressure monitor A can write the received communication protocol to the memory unit therein (e.g., in microprocessor 4). After ensuring that the communication protocol is successfully written into, microprocessor 4 can turn off the power switch of wireless receiver 3, and then wireless receiver 3 can return to the sleep mode. For example, the effective current of wireless receiver 3 is up to 30 mA, and wireless receiver 3 can be timely controlled to be in the sleep mode, thereby saving battery power and prolonging the life of the battery. As shown in S260, the wireless receiver can be controlled to enter the sleep mode. After wireless receiver 3 is woken up, if wireless receiver 3 does not receive the communication protocol within a predetermined time (e.g., due to the absence of host B or other conditions), microprocessor 4 can turn off the power switch of wireless receiver 3, such that wireless receiver 3 may again enter the sleep mode.

Tire pressure monitor A can be installed in the tire and enter normal operation mode after receiving and storing the communication protocol. For example, tire pressure monitoring A can include wake-up sensor 6 and temperature sensor 7. Since tire pressure monitor A is installed inside the tire and may not be frequently replaced, the life of the battery in tire pressure monitor A may be at least several years. Wake-up sensor 6 can wake up tire pressure monitor A from the sleep mode when necessary, thereby achieving the purpose of saving electricity and prolonging battery life. In addition, wake-up sensor 6 can wake up tire pressure monitor A, such that microprocessor 4 can begin operation. Also, since the tire pressure is closely related to the temperature, the tire wear may increase by, e.g., 2% for every 1° C. increase in temperature inside the tire. Therefore, by measuring and acquiring the temperature inside tire through temperature sensor 7, traffic accidents can also be prevented in some cases. It should be understood that tire pressure monitor A can also include other types of sensors and circuitry according to various requirements.

For example, tire pressure monitor A and temperature sensor 7 can send the detected gas pressure parameter and temperature parameter to microprocessor 4 through one or more communication busses, and then microprocessor 4 can serially send the received data to RF transmitter 2. RF transmitter 2 can transmit the radio wave modulated according to the set UHF radio wave through the RF transmitting antenna, in order to acquire the corresponding control operation to prevent the traffic accidents and prolong the life of the tire. As discussed above, a UHF radio wave can refer to the radio wave with a frequency of 300 to 3000 MHz and a wavelength of 1 m to 1 dm.

Since a wireless receiver, pressure sensor, and magnetic sensor are provided in the tire pressure monitor, according to the gas pressure parameter and the magnetic field intensity parameter, the tire pressure monitor can wake up the wireless receiver in order to be able to receive and store the communication protocol sent from the host. In this way, writing the communication protocol to the tire pressure monitor can be performed simply and quickly without significantly consuming battery power. Particular embodiments can also prevent the tire pressure monitor from waking up the wireless receiver due to interference of an external magnetic field during normal operation, which could otherwise result in electricity waste.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A tire pressure monitor, comprising:
   a) a pressure sensor configured to detect a gas pressure parameter of a tire;
   b) a wireless receiver configured to initially be in a sleep mode, and to receive a communication protocol wirelessly after being woken up from said sleep mode, wherein said communication protocol is received and stored in said tire pressure monitor prior to said tire pressure monitor being ready for use, and wherein said communication protocol corresponds to a vehicle model; and
   c) a microprocessor configured to wake up said wireless receiver according to said gas pressure parameter.

2. The tire pressure monitor of claim 1, wherein when said tire pressure monitor is installed in said tire, said microprocessor is configured to wake up said wireless receiver when said gas pressure parameter is greater than a first threshold.

3. The tire pressure monitor of claim 1, further comprising a magnetic sensor configured to detect a magnetic field intensity parameter.

4. The tire pressure monitor of claim 3, wherein before said tire pressure monitor is installed in said tire, said microprocessor is configured to wake up said wireless receiver when both said magnetic field intensity parameter is greater than a second threshold, and said gas pressure parameter is less than a third threshold.

5. The tire pressure monitor of claim 1, wherein said microprocessor is configured to control said wireless receiver to return to said sleep mode when said communication protocol is not received within a predetermined time after waking up said wireless receiver.

6. The tire pressure monitor of claim 1, wherein said wireless receiver is a Bluetooth low energy (BLE) receiver.

7. A code writing device, comprising:
   a) a plurality of said tire pressure monitors of claim 1; and
   b) a host having a wireless transmitter, wherein said wireless transmitter is configured to wirelessly transmit said communication protocol to said tire pressure monitor after said wireless receiver has woken up.

8. The tire pressure monitor of claim 1, wherein after the wireless receiver is woken up, the tire pressure monitor forms a wireless connection with a host to receive and store the communication protocol that corresponds to the vehicle model.

9. A method of monitoring a tire pressure, the method comprising:
   a) acquiring, by a pressure sensor, a gas pressure parameter of a tire;
   b) waking up, by a microprocessor, a wireless receiver from a sleep mode according to said gas pressure parameter in order to receive a communication protocol, wherein said communication protocol is received and stored in said tire pressure monitor prior to said tire pressure monitor being ready for use, and wherein said communication protocol corresponds to a vehicle model; and
   c) writing said communication protocol to a memory in said tire pressure monitor, and then controlling said wireless receiver to be in said sleep mode.

10. The method of claim 9, wherein said waking up said wireless receiver to receive said communication protocol is performed when said gas pressure parameter is greater than a first threshold.

11. The method of claim 9, further comprising:
   a) acquiring, by a magnetic sensor, a magnetic field intensity parameter; and
   b) wherein said waking up said wireless receiver to receive said communication protocol is performed when both said magnetic field intensity parameter is greater than a second threshold, and said gas pressure parameter is less than a third threshold.

12. The method of claim 9, further comprising controlling said wireless receiver to return to said sleep mode when said communication protocol is not received within a predetermined time after waking up said wireless receiver.

* * * * *